April 13, 1954 W. L. PERRY 2,675,152
BOBBIN PACKING MECHANISM
Filed Jan. 6, 1951 12 Sheets-Sheet 2

Inventor
Winthrop L. Perry
by Roberts, Cushman & Groves
att'ys.

April 13, 1954 W. L. PERRY 2,675,152
BOBBIN PACKING MECHANISM
Filed Jan. 6, 1951 12 Sheets-Sheet 4
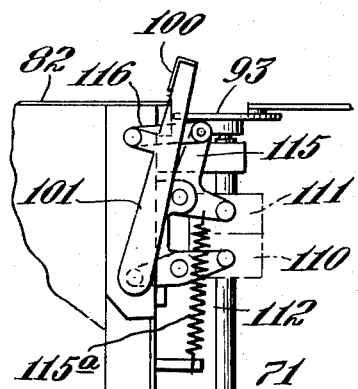
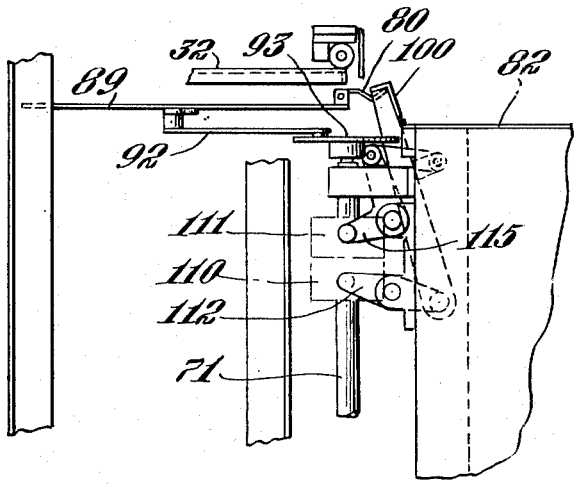
Fig.5
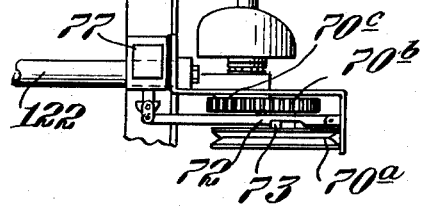
Fig.4
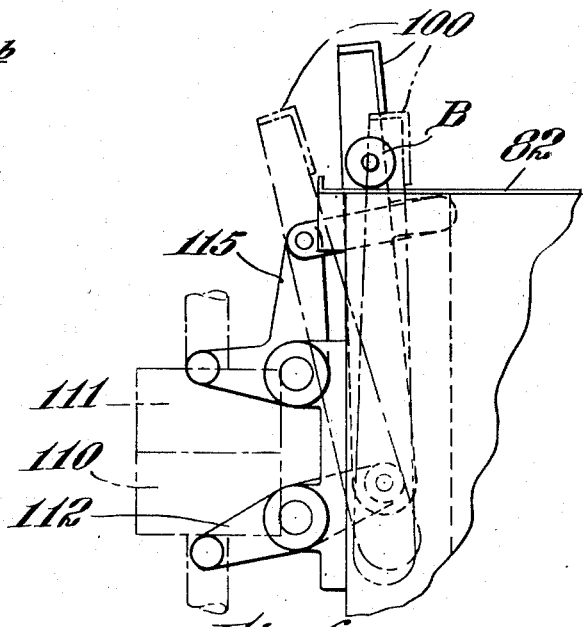
Fig.6
Inventor
Winthrop L. Perry
by Roberts, Cushman & Grover
att'ys.

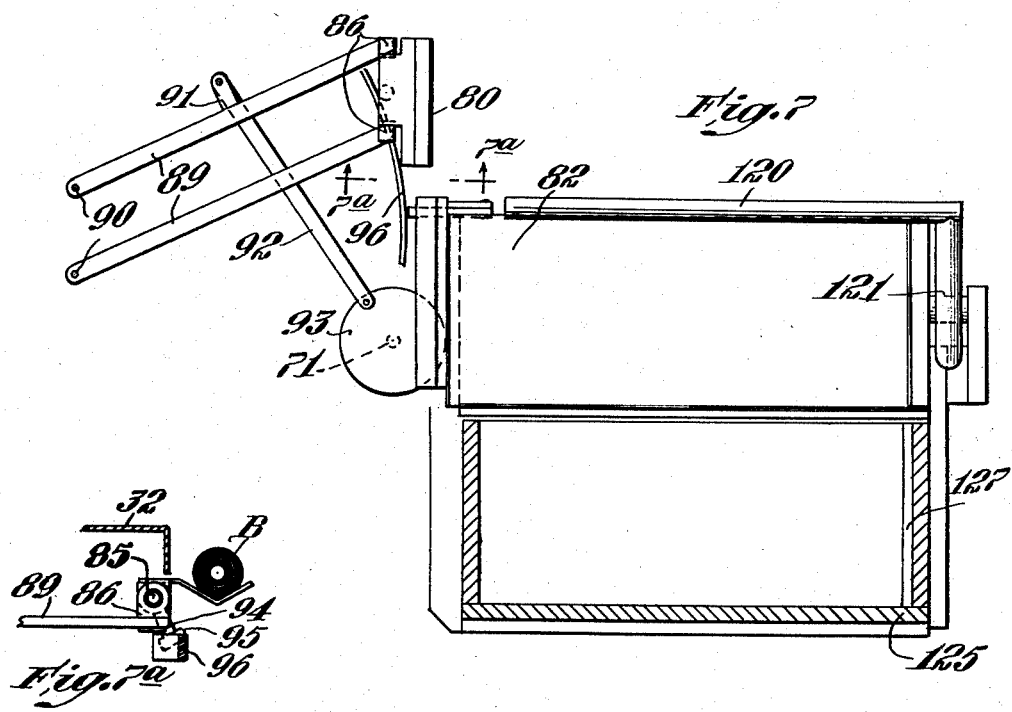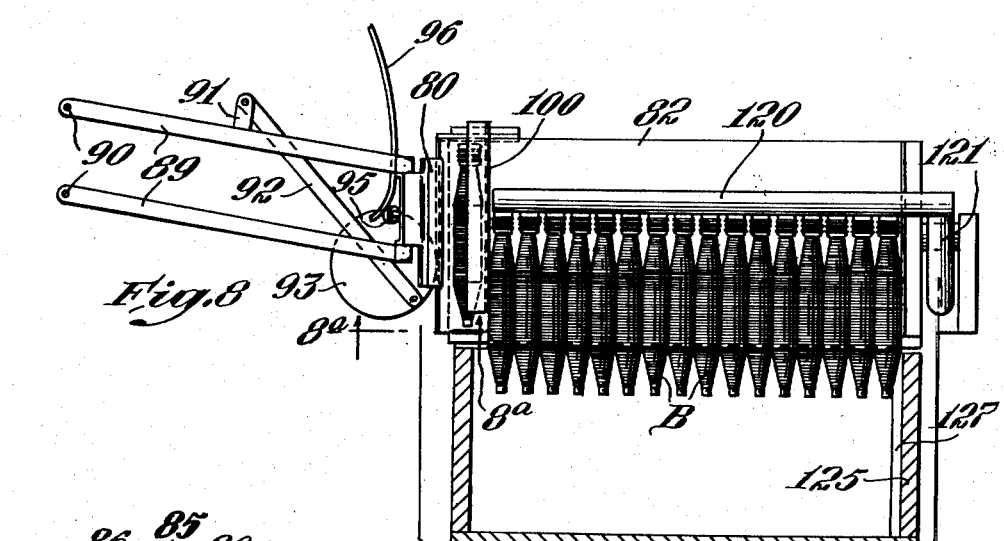

April 13, 1954

W. L. PERRY 2,675,152

BOBBIN PACKING MECHANISM

Filed Jan. 6, 1951

Inventor
Winthrop L. Perry
by Roberts, Cushman & Grover
Att'ys.

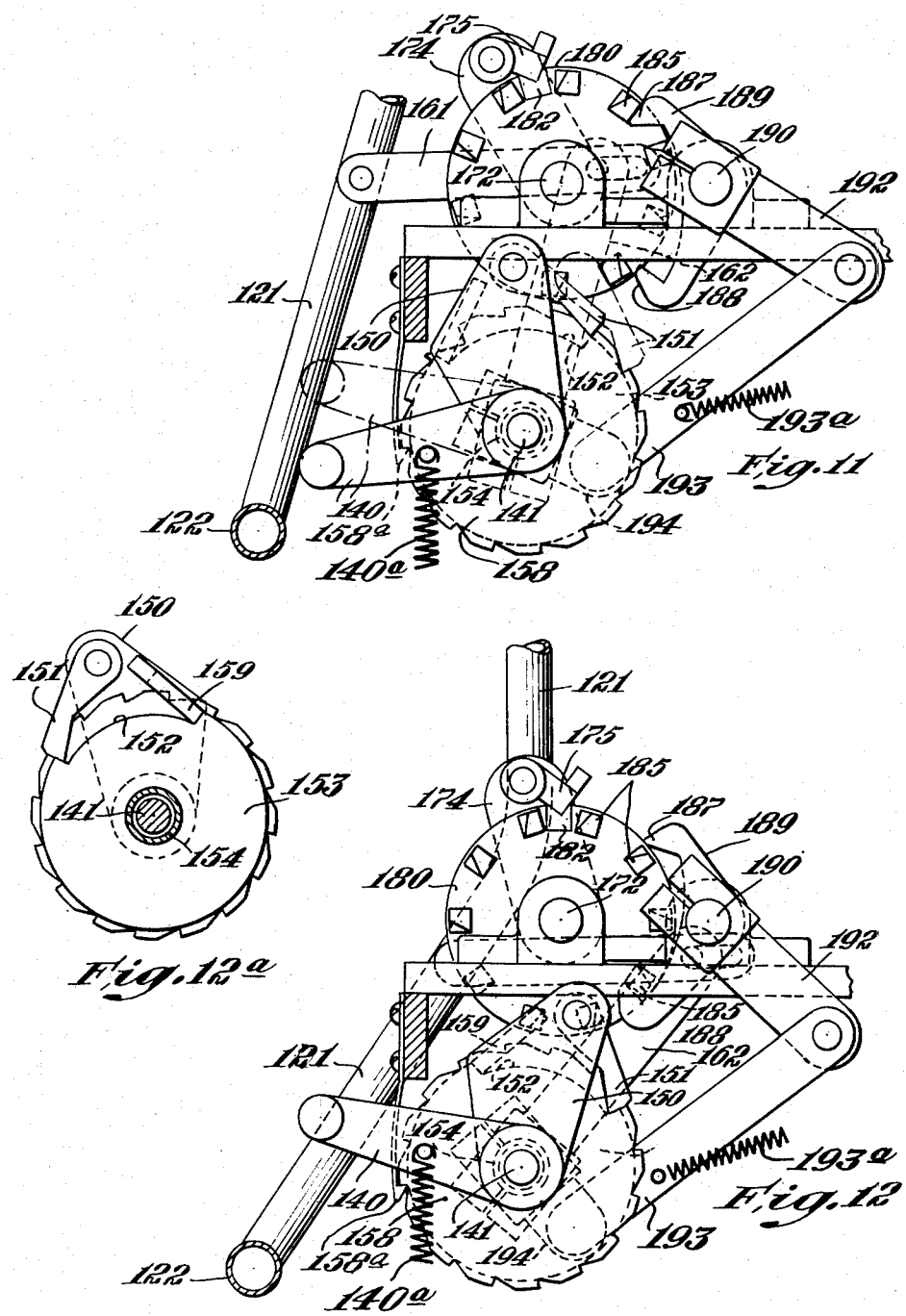

Inventor
Winthrop L. Perry
by Roberts, Cushman & Grover
att'ys.

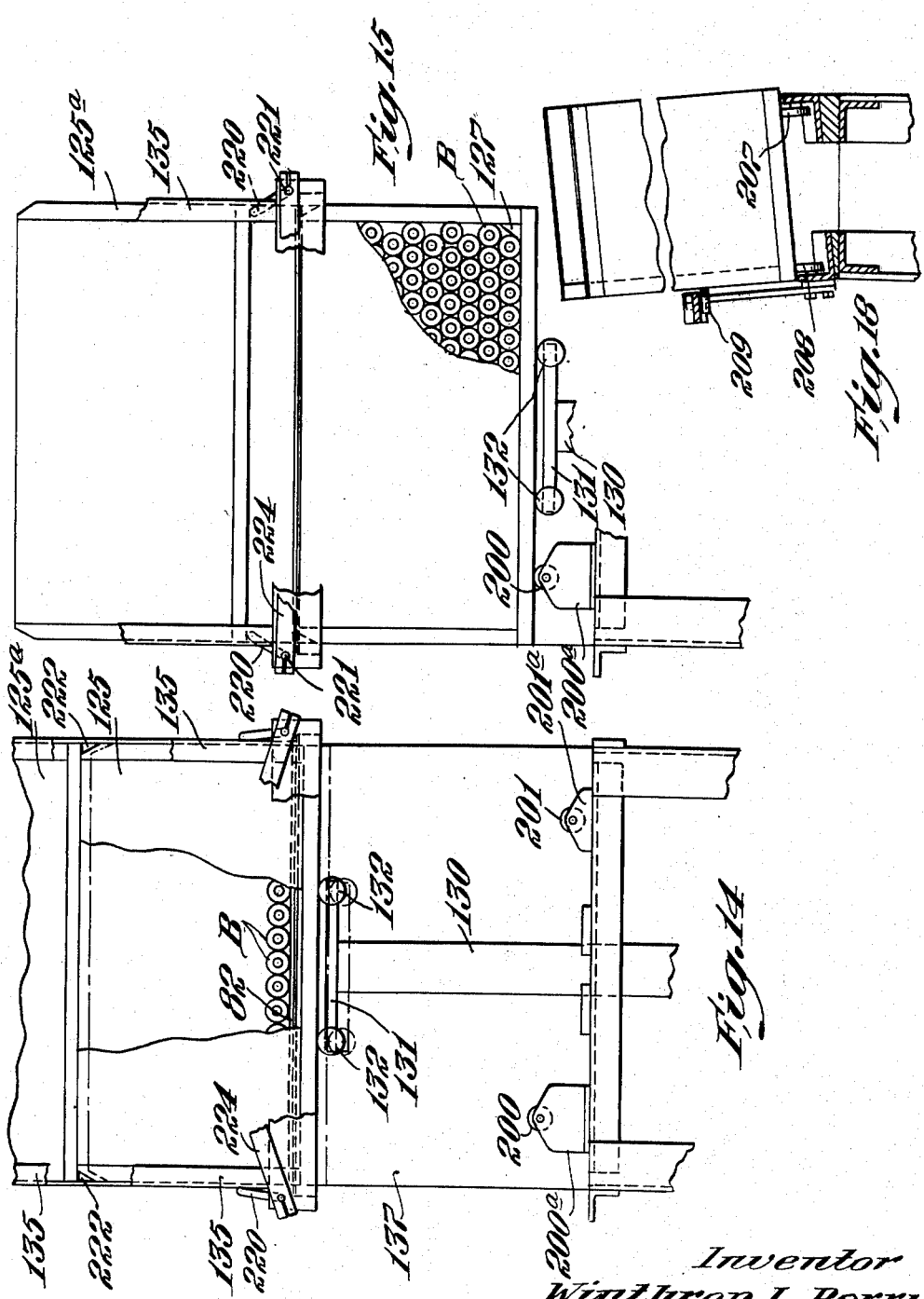

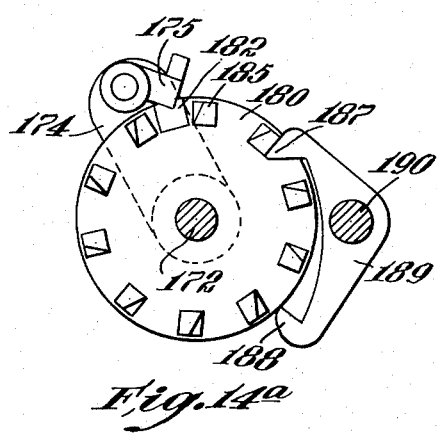
Fig.14ª
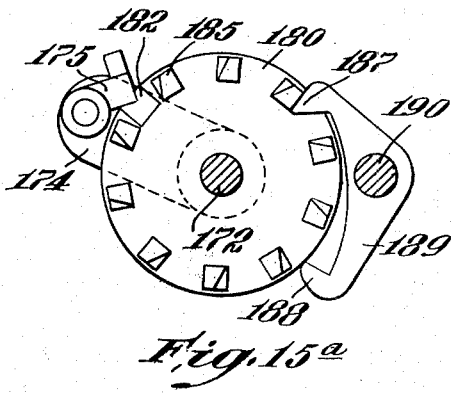
Fig.15ª
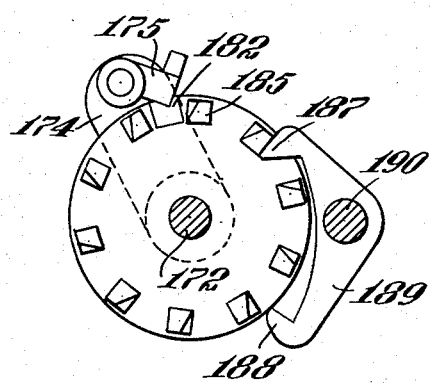
Fig.16ª
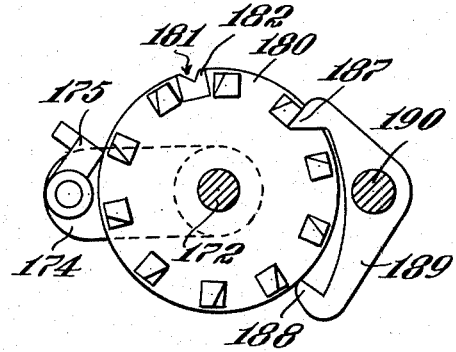
Fig.17ª

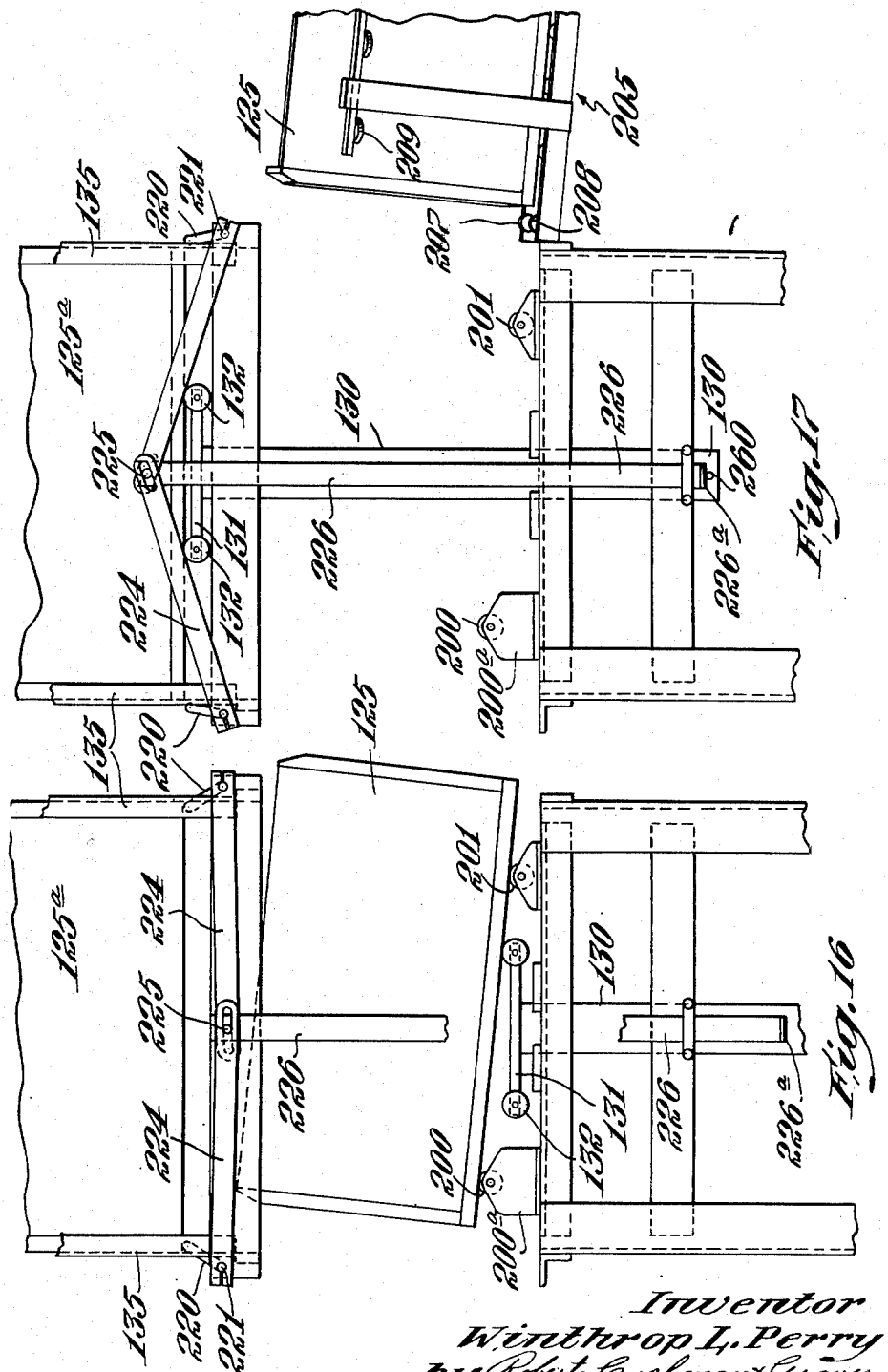

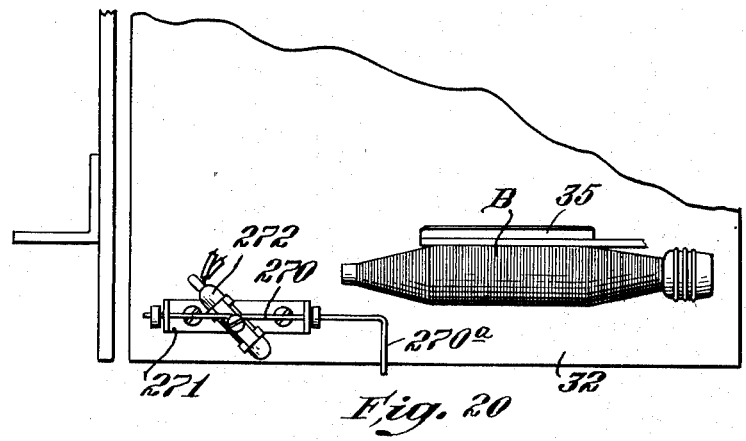
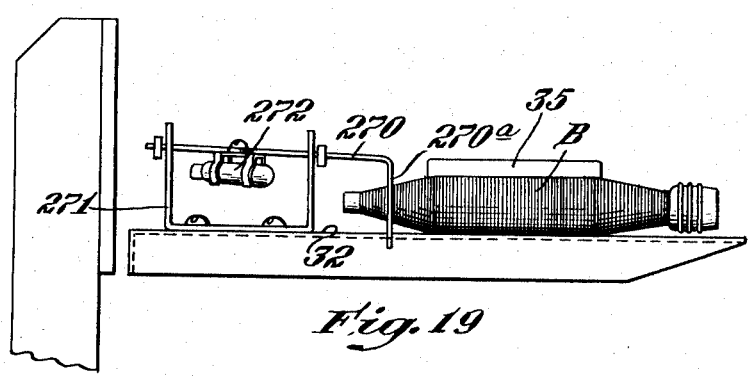

Patented Apr. 13, 1954

2,675,152

UNITED STATES PATENT OFFICE 2,675,152

BOBBIN PACKING MECHANISM

Winthrop L. Perry, Milford, N. H., assignor to Abbott Machine Co., Inc., Wilton, N. H., a corporation of New Hampshire Application January 6, 1951, Serial No. 204,738

10 Claims. (Cl. 226—3)

This invention relates to bobbin-packing mechanism adapted to act in conjunction with thread winding machines to pack wound loom bobbins systematically into containers, and more especially into open-sided containers adapted for easy removal of the bobbins in the weave room.

The invention aims to handle the bobbins in such a manner as to avoid any displacement of wound thread or any injury to the outer layers of thread, and to handle the bobbins gently and avoid injury to delicate synthetic threads, but at the same time to handle the bobbins fast enough to keep pace with the high rate of production of a winding machine having a large number of winding units.

The invention further aims to provide a bobbin-packing mechanism which can operate smoothly and reliably at high speed in timed relation with the rapid passage of travel of traveling spindle winding units which may, for example, pass the bobbin-packing mechanism at the rate of 20 winding units per minute or faster.

The invention further aims to minimize need for handling of the containers into which the bobbins are packed and to provide a reserve of such containers awaiting filling, so that the device will need attention only at intervals.

Other objects of the invention and advantageous features will be apparent from this specification and its accompanying drawings in which the invention is explained by reference to a preferred example of the invention.

In the accompanying drawings,

Fig. 4 is a fragmentary rear view showing parts of the main drive of the bobbin-boxing mechanism and connections from the main drive to a first bobbin pusher of the mechanism;

Fig. 5 is a diagram, from the front of the mechanism, showing the first bobbin pusher in a retracted position;

Fig. 6 is a diagram, also from the front but on a larger scale than Fig. 5, showing successive positions of the first bobbin pusher;

Fig. 7 is a diagram, from a horizontal plane, corresponding to Fig. 5;

Figure 9:
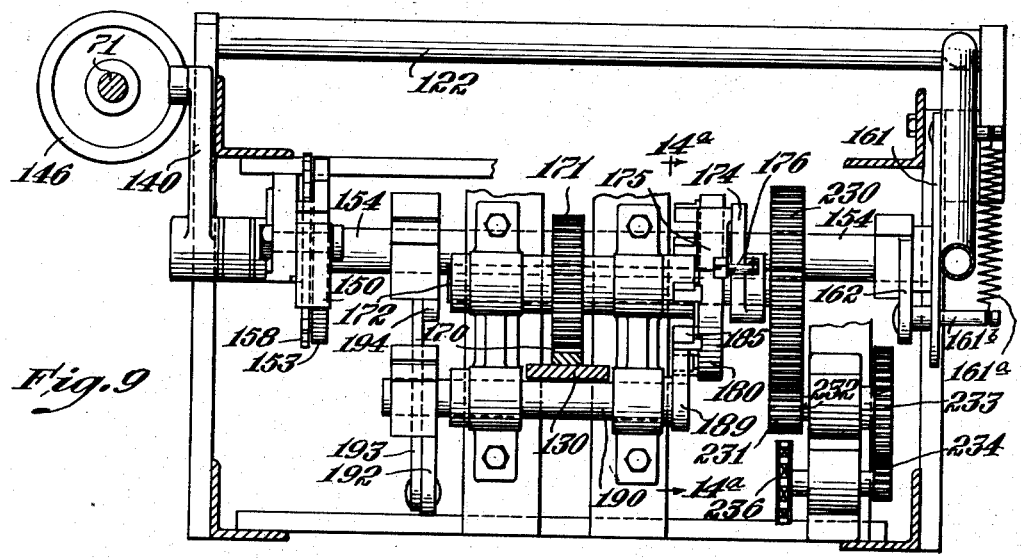
Figure 10:
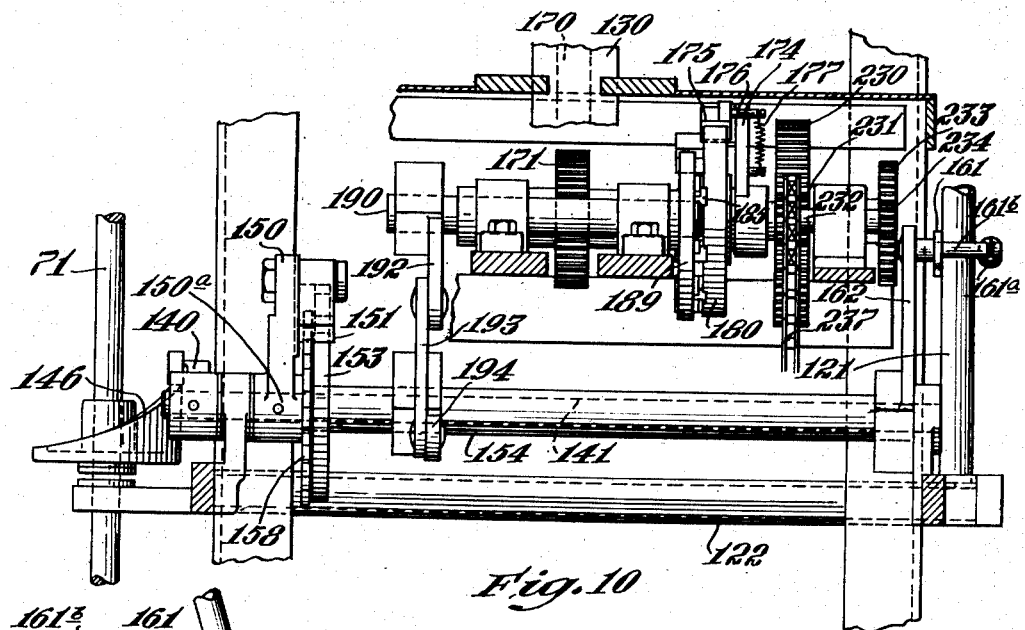
Figure 10A:
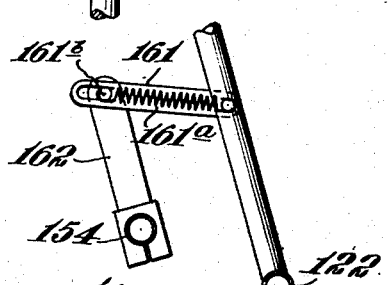
Figure 13:
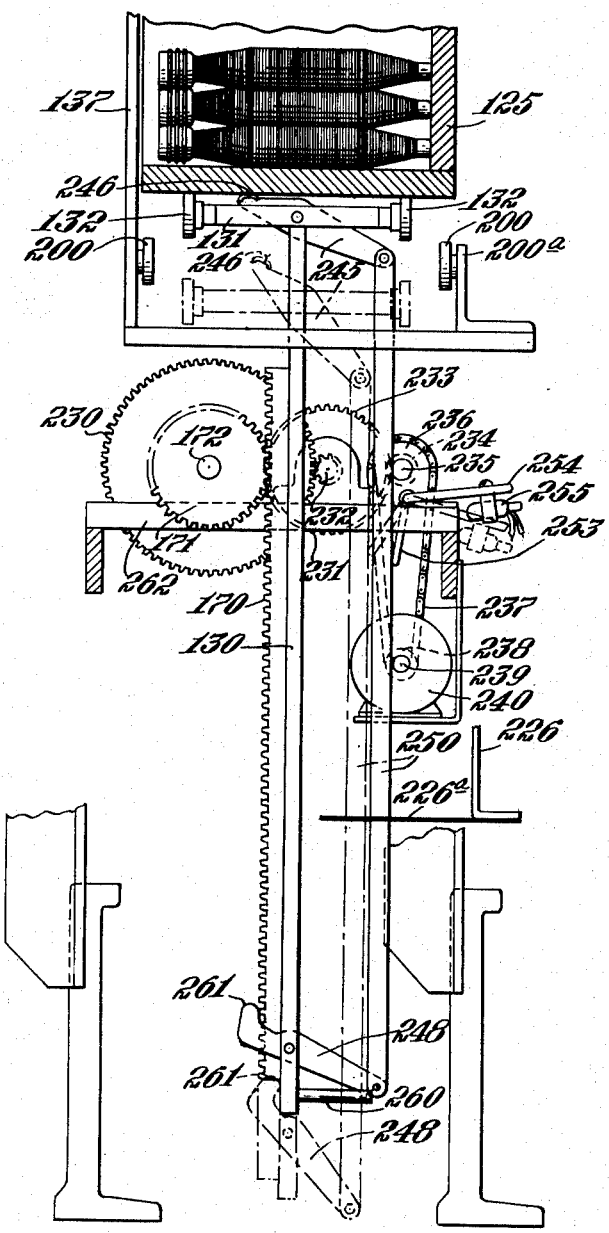

Fig. 7ª is a fragmentary view in the nature of a vertical section taken on the line 7ª—7ª of Fig. 7 (or of Fig. 2) with various parts omitted, showing a wound bobbin having rolled from the lower plow plate of the winding machine onto a swinging cradle;

Fig. 8 is a diagram, from a horizontal plane, corresponding to Fig. 6, and also showing a layer of bobbins being pushed from a platform by a second bobbin pusher;

Fig. 8ª is a fragmentary view similar to Fig. 7ª but taken on the line 8ª—8ª of Fig. 8 showing the bobbin as having rolled from the cradle onto the platform;

Fig. 9 is a diagram from a horizontal plane at a lower level than Fig. 7 showing interior driving connections;

Fig. 10 is a diagram viewing the mechanism of Fig. 9 from the front;

Fig. 10ª is a fragmentary diagrammatic view, taken from the right of the machine, showing certain connections to the arm which carries the second pusher;

Figs. 11 and 12 are diagrams taken from the left of either Fig. 9 or Fig. 10, showing portions of the driving connections of Figs. 9 and 10 at the two stages in their operation;

Fig. 12ª is a diagram of portions of the driving connections of Fig. 12 taken from the opposite side thereof, that is, from the right of the machine;

Fig. 13 is a diagram, taken from the left, showing the elevator of the bobbin-packing mechanism and certain of the driving connections thereto;

Figs. 14, 15, 16 and 17 are diagrams taken from the front, showing successive positions of the elevator and the bobbin boxes;

Figs. 14ª, 15ª, 16ª and 17ª are vertical sectional views taken on the line 14ª—14ª of Fig. 9 showing successive positions of the escapement mechanism corresponding respectively to the positions of the elevator shown in Figs. 14 to 17;

Fig. 18 is a right elevation of a supplemental conveyor which receives full boxes from the elevator;

Fig. 19 is a fragmentary right elevation, partly diagrammatic, taken facing the discharge end of the lower plow plate, and showing an alternate form of switch mechanism for causing actuation of the bobbin-packing mechanism; and Fig. 20 is a fragmentary plan view of the switch mechanism of Fig. 19.

Although some features of the invention may advantageously be applied to winding machines in which tending mechanism attends to the changing of bobbins at only a single winding unit, or tending mechanism attends to the changing of bobbins of a plurality of winding units simultaneously, the invention has its fullest utility when applied to a multiple unit winding machine in which a tending mechanism attends to the changing of the bobbins of a plurality of winding units in succession. In the preferred form of mechanism shown, the relative travel, as between the plurality of winding units and the bobbin-changing tending mechanism, is brought about by moving the winding units in a procession past the tending mechanism as in certain patents mentioned below.

Figure 1:
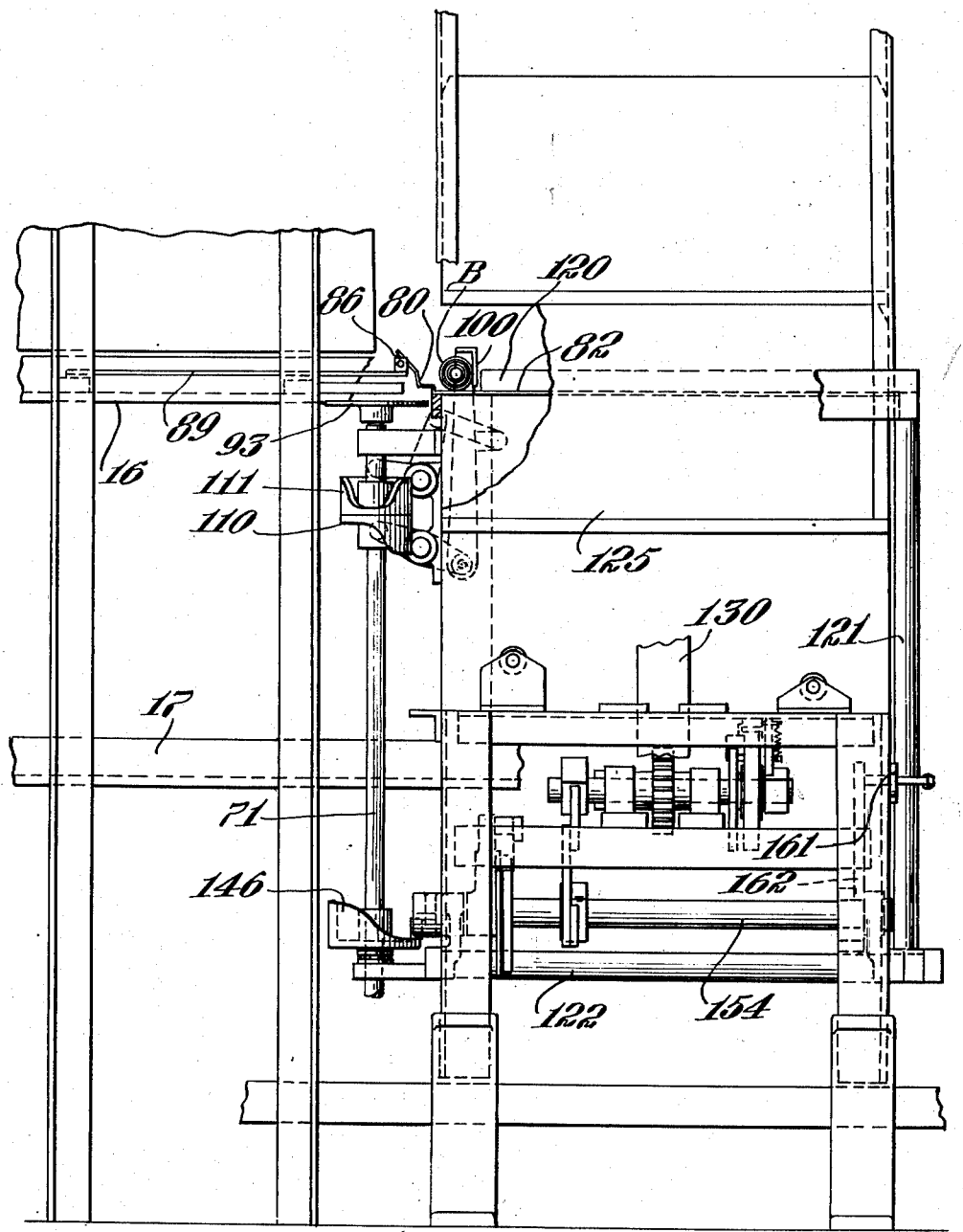
Fig. 1 is a front elevation of bobbin-packing mechanism according to the invention, with some parts broken away and some parts omitted.
Figure 2:
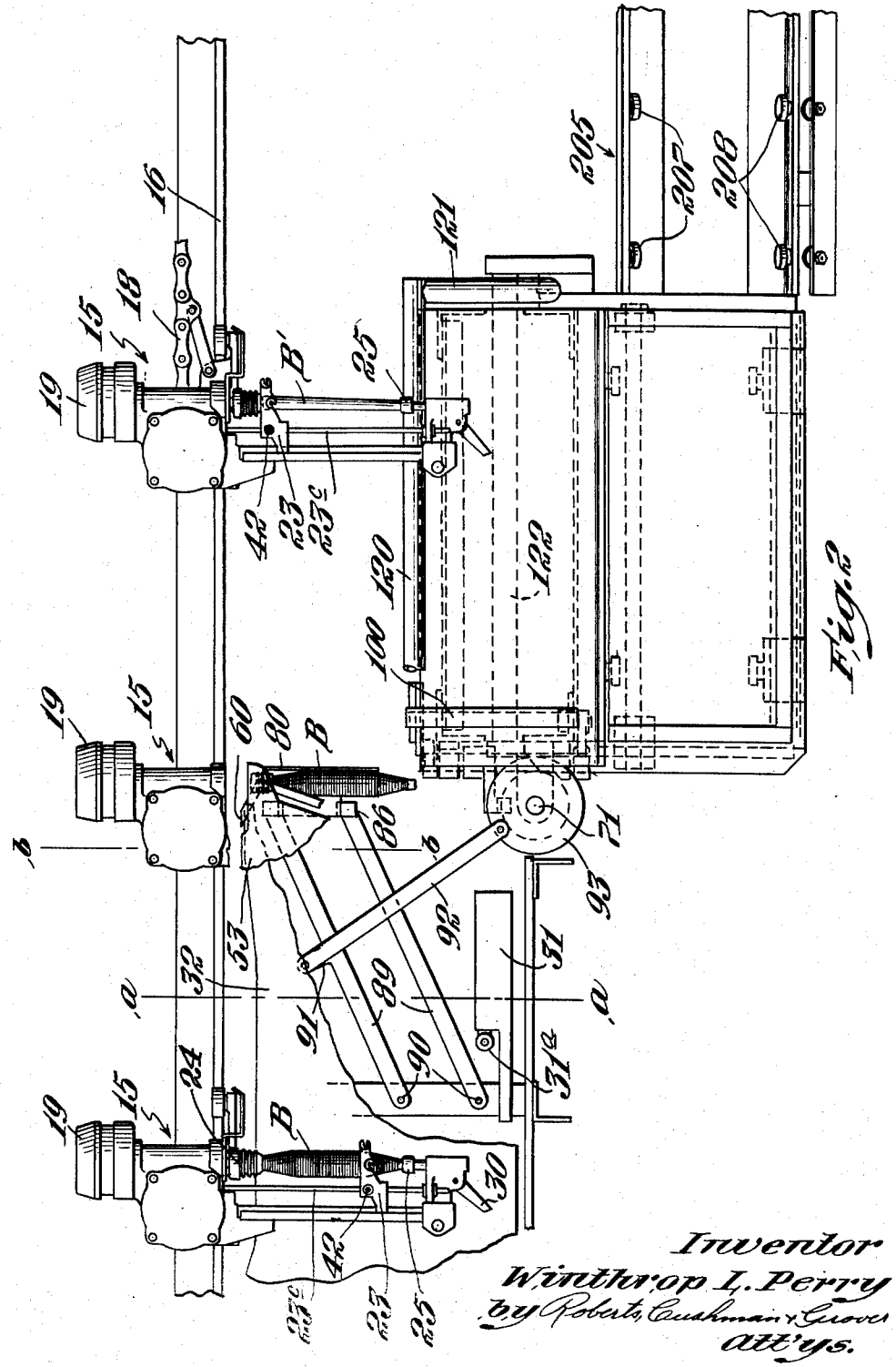
Fig. 2 is a plan view showing portions of a traveling spindle filling winding machine and the bobbin-packing mechanism applied thereto.
Figure 3:
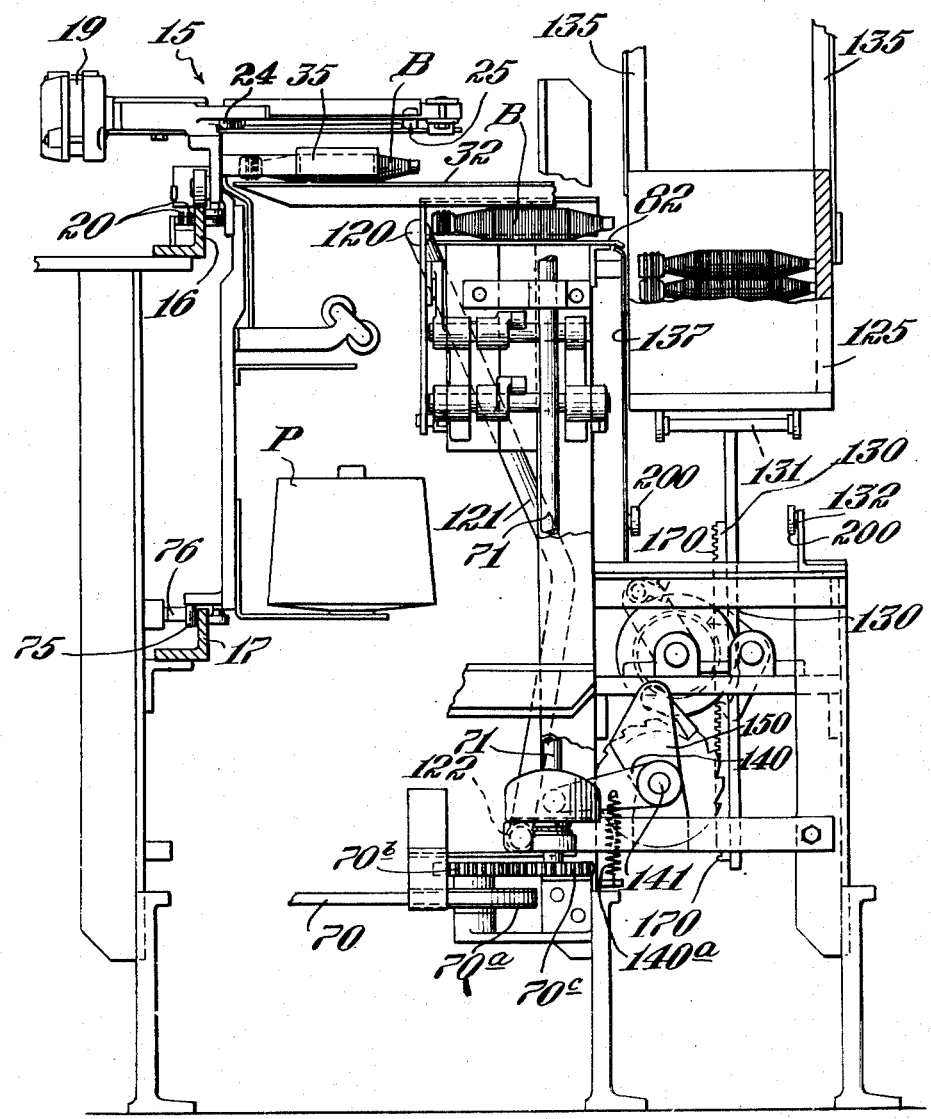
Fig. 3 is a left elevation of the apparatus of Figs. 1 and 2, with some parts omitted and some parts in vertical section.

The winding machine to which the invention is shown as applied includes, as best shown in Figs. 2 and 3, a plurality of traveling winding units 15 movable by means of a chain 18 upon tracks consisting of upper and lower rails 16 and 17 respectively, in a closed counterclockwise path of travel having straight side portions and semicircular end portions as in United States Reissue Patent No. 22,492 and United States Patent No. 2,395,028.

Each winding unit is preferably individually driven by its own electric motor 19, such motor deriving its current through the frame of the machine and through suitable brushes contacting with stationary conductor bars 20 (Fig. 3) so as to wind thread onto an individual bobbin B as the winding unit travels around the machine. The conductor bars 20 extend completely around the machine excepting in the region of the automatic bobbin-changing mechanism.

During winding, the bobbin B is held between inner and outer chucks or rotatable hollow centers 24 and 25, the inner center 24 being rotated by the motor 19 to rotate the bobbin.

The thread guide assembly 23, which distributes the thread on the bobbin with a filling type of winding, is preferably of the type that is frictionally mounted for sliding movement upon a traverse rod 23$^c$ which is reciprocated with a short stroke of traverse by suitable traverse cam and linkage connections from the motor 19. During the winding of the bobbin the thread guide assembly 23 is progressively advanced along the rod 23$^c$, from near the base of the bobbin to near the tip of the bobbin either by means of a stationary overhead abutment or cam similar to that described in U. S. Patent No. 2,362,455 which reacts upon an upstanding roller 42 upon the thread guide assembly, or by feeler mechanism such as described in United States Patent No. 2,377,367, thus providing the filling type of winding on the bobbin.

As a winding unit, in an inactive condition, enters the bobbin-changing mechanism of the winding machine from the left in Fig. 2, the outer center 25 of the winding unit is retracted, at the position $a$—$a$, by a crank arm 30 on the winding unit encountering a non-traveling abutment 31. The left end of this abutment is preferably in the form of a rotatable wheel 31$^a$ adapted to ease the movement of the crank arm 30 onto the abutment 31. The wound bobbin then drops from the centers 24 and 25 onto a lower horizontal stationary plow plate 32, shown partly broken away in Fig. 2, which extends along the path of travel of the winding units underneath their head portions. A generally vertical plate 35 on the winding unit then pushes the discharged bobbin along with the winding unit to the right end of the lower plow plate 32.

Near the right end of the bobbin-changing mechanism, at position $b$—$b$ as shown in Fig. 2, the winding unit reaches bobbin-feeding mechanism which may be that of Fig. 21 of said Patent No. 2,377,367 at which an empty bobbin B' is releasably held while the outer center 25 closes upon this empty bobbin, its base end entering the hollow base center 24, and thus causing this bobbin to be withdrawn from the bobbin-feeding mechanism.

An upper plow plate 53 (of which only a fragment of the right end is shown in Fig. 2) located at a level above the discharged bobbin, carries the cooperating blades of a cutter, blade 60 of which is pivoted and closed automatically at each passage of a winding unit by any suitable mechanism, for instance by the mechanism for closing the corresponding blade as shown in United States patent application Serial No. 103,242, filed July 6, 1949. This cutter severs the thread between the new bobbin B' and the full discharged bobbin B just before the full bobbin B reaches the right end of the lower plow plate 32.

As an aid to explaining the particular construction of the preferred form of bobbin-packing mechanism of this invention, certain of its main operations may be briefly outlined as follows. The discharged bobbins B, arriving at the right end of the lower plow plate 32, are transferred one at a time to a platform upon which they are arranged as a group of for example sixteen bobbins intended to constitute a layer in the bobbin box; these bobbins are advanced along the platform step by step, sidewise, until the group has been accumulated; and the bobbins of this group, sufficient to form one layer in a box, are pushed endwise off the platform into an open-sided box. This box is positioned so that each entering layer of bobbins drops slightly in entering the box, so that the bobbins of the entering layer do not rub against the bobbins of the next lower layer or the bottom of the box. Successive layers of the bobbins are staggered in the box. As it receives successive layers of bobbins, the box is progressively lowered by a box-lowering elevator until the box receives its topmost layer, and then is automatically removed and preferably tilted away from its open side so as to prevent any accidental displacement of its bobbins. The box-lowering elevator rises and receives a new empty box which has been held in reserve, and automatically lowers to the proper level for reception of the first layer therein. This operation may be continued indefinitely. At rather infrequent intervals, the operator supplies new empty boxes, and attends to the conveying away of a group of the boxes which have been packed with bobbins.

*Main drive*

The bobbin-packing mechanism is driven in timed relation to the travel of the winding units, by power received from any suitable source for instance from the winding machine.

Thus a belt 70 (Fig. 3) may be constantly driven by any suitable pulley, shaft and gearing connection, not shown, from one of the sprocket wheels on which the conveyor chain 18 runs. Belt 70 may be in frictional engagement with a pulley 70$^a$ connected by gears 70$^b$ and 70$^c$ to a main vertical shaft 71, so that the belt constantly tends to rotate this pulley and shaft, and the pulley and shaft may be normally held against rotation by a latch 72 engaging a stop 73 on the pulley as shown in Fig. 4. A projection 75 from each traveling winding unit is arranged to close a microswitch 76 which is in circuit with a solenoid 77 connected to lift the latch 72, thus permitting the belt to drive the main vertical shaft 71 one revolution at each passage of a winding unit.

Cradle mechanism

As each wound bobbin reaches the right end of the lower plow plate 32 it rolls off onto a swinging and tilting cradle 80 which at the moment is positioned as in Fig. 2 to receive the bobbin. Cradle 80 thereupon swings away from the tracks of the winding machine, from the position of Figs. 2 and 7 to the position of Fig. 8, to transfer its bobbin onto a platform 82.

A cross rod 85 (Figs. 7ª and 8ª), on which the cradle is adapted to tilt as subsequently described, is fixed in blocks 86 at each end. The two such blocks 86 are connected by vertical pivots to horizontal parallel links 89, which in turn are pivotally mounted at 90 upon a stationary part of the winding machine. An extension 91 extending from one of the links 89 is connected by a link 92 to a crank disk 93 fast on an upper end of vertical drive shaft 71. One revolution of the vertical shaft 71, corresponding to the passage of a single winding unit, shifts the cradle from its bobbin-receiving position of Figs. 2, 7 and 7ª to its discharging position of Figs. 8 and 8ª and then returns the cradle to its receiving position of Figs. 2, 7 and 7ª.

The cradle is in a generally horizontal position throughout most of its travel to its discharging position, but tilts near the end of this travel to permit the bobbin to roll off onto the platform 82. The cradle carries a downwardly extending arm 94 carrying a roller 95 adapted to roll along against a guide surface 96 to determine the inclination of the cradle, holding the cradle approximately horizontally until the cradle is near its discharging position. Close to the discharging position of the cradle, the guide surface 96 retreats, permitting the cradle to tilt to allow the bobbin to roll onto the platform 82.

First pusher

The bobbins transferred onto the platform 82 are pushed sidewise along the platform, step by step, by a first pusher 100 which is preferably a bar of inverted L-shaped section mounted at the top of a movable arm 101 as shown from the rear in Fig. 4.

At the time a bobbin rolls from the cradle 80 onto the platform 82, the first pusher 100 occupies the right-hand position shown in Fig. 6, ahead of the bobbin and acting as a stop therefor; the first pusher then rises above the bobbin and passes thereover, as in the full-line middle position of Fig. 6, and then lowers behind or to the left of the bobbin as in the left position of Fig. 6. Thereupon the first pusher swings forward or to the right in Fig. 6, against the bobbin without materially rising, pushing such bobbin, together with any bobbins ahead of such bobbin, one step along the platform until the first pusher again reaches the righthand position of Fig. 6. During sixteen such cycles of operation, the accumulating bobbins are advanced side by side in a group along the platform until the group consists of sixteen bobbins, sufficient to form one layer in the bobbin box.

This compound motion of the first pusher is accomplished by two cams 110 and 111 (Fig. 4) on the main vertical shaft 71. Cam 110 operates a lever 112, to which the lower end of arm 101 is pivoted, to raise the arm 101 and the first pusher preparatory to the first pusher moving back over the bobbin, and then to lower the first pusher behind the bobbin. Cam 111 actuates a bell crank 115, connected by a link 116 to the arm 101, to swing arm 101 and the first pusher back and forth along the platform. Any suitable springs may be employed to aid in keeping the levers 112 and 115 in operative engagement with their respective cams 110 and 111, one such spring 115ª being shown diagrammatically in Fig. 4 as acting on lever 115.

Second pusher

A second pusher 120, preferably having the form of a horizontally disposed tube carried by a bent, generally vertical, pivoted arm 121, normally lies at the rear of the platform 82 as shown in Figs. 2, 3 and 7, behind the base ends of the bobbins being accumulated. The arm 121 carrying the pusher 120 may be fast on a lower horizontal tubular member 122 which is pivotally mounted at its two ends in the lower portion of the frame of the machine. Upon the accumulation of sixteen bobbins upon the platform, the second pusher 120 is adapted to advance across the platform toward the front, as shown in Fig. 8, pushing the bobbins of the group endwise off of the front of the platform and into a bobbin box 125 in front of the platform. During this delivery into the box, still another bobbin is being transferred to the platform to start the accumulation of a further layer, but as shown in Fig. 8, such other bobbin is separated by the first pusher 100 (then in its forward position) from the group of bobbins being discharged, and such other bobbin is not advanced along the platform by the first pusher until the second pusher has returned to, or nearly to, its rear inactive position. In its forward position, the first pusher 100 constitutes a side guide for the last bobbin of the accumulated layer being pushed off the platform by the second pusher in Fig. 8.

Bobbin container

While many of the features of the invention are applicable to the packing of bobbins in various kinds of containers for use in the weave room, the containers 125 shown in the drawings are of a very simple type of wooden box comprising a bottom, two end walls and a front wall but no top or rear wall. The open rear side of the box is disposed toward the platform 82, so that layers of bobbins can enter the box through this open side, and is automatically lowered by means of a container-lowering elevator, subsequently described, in such manner that each entering layer of bobbins drops slightly in passing from the platform 82 into the box, thus avoiding any substantial rubbing of incoming bobbins over the next lower layer of bobbins, or any long uncontrolled drop of the entering bobbins.

To stagger the bobbins of the successive layers systematically, so that bobbins of a given layer nest midway between bobbins of the next underlying layer, the interior of the box is provided with a fillet 127 (Figs. 7, 8 and 15) between its bottom and one end wall, which causes the first layer to be displaced to the left away from such end wall for a distance of about one-half the diameter of a bobbin, and against the opposite end wall. This systematic displacement of the initial layer results in subsequent layers nesting uniformly in staggered relation to the respectively underlying layers as shown in Fig. 15.

Container-lowering elevator

The container-lowering elevator is shown as comprising a plunger 130 (Figs. 13 and 14) vertically slidable in the frame of the machine and provided at its top with a horizontal plate 131 carrying four rollers 132 mounted in ball bearings and adapted to support a box. An open framework comprising four vertical angle pieces 135 (Fig. 14) constitutes a vertical guideway for each box until the box has received its topmost layer of bobbins, and an apron plate 137 extending down from the front of the platform 82 serves to close the open rear side of the box up to the level of the platform.

*Connections to the second pusher and container lowering elevator*

Each actuation of the second pusher 120 to discharge a layer of bobbins into the bobbin box takes place upon the delivery of sixteen bobbins to the platform, but does not interrupt the sequence of delivery of the bobbins to the platform from the traveling winding units, and each actuation of the second pusher is accompanied by a controlled lowering of the box.

The lowering of the box is preferably accomplished by gravity, under the control of escapement mechanism, which permits step-by-step drop of the elevator from one bobbin-receiving level to the next. Each such drop of the elevator from one bobbin-receiving level to the next preferably is made to consist of two parts with a momentary stop therebetween, thus minimizing the impact attendant upon such drop of the elevator.

A crank 140 on a rockable shaft 141 (Figs. 9, 10, 11 and 12) is rocked by a cam 146 on the main vertical shaft 71, thus imparting to the shaft 141 one cycle of rocking movement for each cycle of operation of the cradle 80 and of the first pusher 100. A spring 140a diagrammatically shown in Figs. 3 and 11 may be employed to cause the crank 140 to follow the surface of cam 146. Sixteen such cycles of rocking movement of the shaft 141 are employed to cause one cycle of operation of the second pusher and the escapement mechanism which controls lowering of the container-lowering elevator.

An arm 150 having its hub 150a fast on shaft 141 carries a pawl 151 (Figs. 10 and 11) adapted to drop into a segmental recess 152 in the periphery of a circular plate 153 fast upon a rockable sleeve 154 surrounding the shaft 141.

A ratchet disk 158 is rotatable relative to the hub 150a and is prevented from turning counterclockwise as viewed in Figs. 11 and 12 by a one-way spring latch or detent 158a. Ratchet disk 158 is provided with sixteen cut-out portions on its periphery each adapted to receive the pawl 151. Fifteen such cut-out portions are sufficiently shallow to maintain the pawl out of the segmental recess 152 of plate 153 as in Fig. 11. As will be seen from the broken line position of the crank 140 and pawl 151 in Fig. 11, rocking of the shaft 141 in this case has merely moved the pawl 151 idly over the circular plate 153, the ratchet disk 158 constituting a shield preventing the pawl from entering the segmental recess 152 in plate 153. This action, which takes place in the case of fifteen deliveries of bobbins to the platform, thus fails to rock the plate 153, the sleeve 154, or the second pusher and the escapement mechanism which are controlled by sleeve 154.

On the other hand the sixteenth cut-out portion in the ratchet disk 158 is sufficiently deep to permit the pawl 151 to drop into the segmental recess 152, and when the arm 140 and pawl 151 are rocked under these circumstances, on the sixteenth cycle of operation of the cradle 80 and first pusher 100, as in Fig. 12, the pawl 151 rocks the circular plate 153 and sleeve 154.

As viewed in Fig. 12 the pawl 151 has entered into the right-hand end of the segmental recess 152 and has rocked the plate 153 and sleeve 154 clockwise, the arm 140 there being shown at its high point to which it is brought by the high point of the cam 146. Upon fall of the surface of cam 146, the force of spring 140a and weight of arm 140 restore the arm 150 and pawl 151 to their position of Fig. 11. To restore the plate 153 and sleeve 154 to their normal positions, the arm 150, which carries the pawl 151, is provided with a dog in the form of a block 159 which continuously extends into the segmental recess 152 at the rear end thereof, as best shown in Fig. 12a. Return of the crank 140 and arm 150 to their normal positions of Fig. 11 therefore acts through the block 159 to restore the plate 153 to its normal position of Fig. 11, thus indexing the sleeve 154 in predetermined position.

The arm 121 that carries the second pusher 120 is connected by a slotted link 161, and also by a spring 161a, to a pin 161b upon a crank arm 162 on the rockable sleeve 154, so that rocking of this sleeve as above described swings the arm 121 from its normal position of Fig. 11 to its position shown in Fig. 12, carrying the second pusher 120 forwardly to discharge a layer of bobbins into the box, and then returning the second pusher to its rear inactive position.

*Escapement to allow elevator to lower*

The elevator plunger 130 is provided on its rear vertical face with a rack 170 constantly in mesh with a gear 171 (Fig. 9) which is fast on a countershaft 172, Figs. 9, 11 and 12, so that the weight of the elevator and plunger tends to rotate the countershaft 172 clockwise as viewed in Figs. 11 and 12. Countershaft 172 has fast thereon an arm 174 carrying a pawl 175 at its outer end, the pawl having attached thereto a pin 176 to which is connected a spring 177 urging the pawl inwardly.

The pawl 175 is normally engaged in a peripheral recess in an escapement wheel 180, the pawl being shown in this recess in Figs. 11, 12 and 14a, but being shown out of the recess in Fig. 17a where this recess is indicated at 181. The recess 181 is preferably formed in a block of hardened steel 182 which is inset into the periphery of the escape wheel 180. When the pawl 175 is engaged in the recess 181, the pawl establishes a driving connection whereby the elevator tends to rotate the escape wheel 180; this however is a one-way connection such as to permit idle upward movement of the elevator without rotation of the escape wheel.

In the illustrated construction where the box is filled with ten layers of bobbins, the escape wheel 180 is provided with ten equally spaced escape pins 185 which are set into the side face of the escape wheel and are adapted to be engaged by pallets 187 and 188 on a pallet lever 189 which is fast on a shaft 190.

Shaft 190 and the pallet lever 189 are adapted to be rocked at each time the second pusher is rocked by connections to the rockable sleeve 154 shown as comprising a crank arm 192, a link 193 and a crank arm 194 connected to the sleeve 154. These connections and the pallet lever 189 are yieldingly urged toward their positions of Fig. 11 by a spring diagrammatically indicated at 193a.

Fig. 11 shows the escape wheel 180 as held in its normal locked position by the upper pallet 187 engaging an escapement pin 185. Fig. 12, which corresponds to the extreme rocked position of sleeve 154, shows the upper pallet 187 having released the escapement pin 185 and the lower pallet 188 having been inserted into the path of the escapement pins, to hold another escapement pin 185, the escapement wheel and the shaft 172 having rotated a few degrees clockwise from the position of Fig. 11. This position of Fig. 12 represents the end of the first part of a two-part drop of the elevator that accompanies each discharge of a group of bobbins into the bobbin box. Return of the pallet lever to the position of Fig. 11 restores the upper pallet 187 into position to hold the escapement pin 185 next following the one it previously held, completing the second part of the two-part drop of the elevator.

It will be observed that as the elevator is progressively lowered by such successive drops, each of two parts, the arm 174 and pawl 175 accompanied by the escape wheel 180 will make a full counterclockwise rotation as viewed in Figs. 14ᵃ, 15ᵃ and 16ᵃ, corresponding to the delivery into the box of ten layers of bobbins. Thus Fig. 14ᵃ may be taken as representing the position of the lever 174 and escape wheel 180 when the elevator is ready to make the first part of a drop in connection with the delivery of the first layer of bobbins; Fig. 15ᵃ in which the lever 174 is 324° clockwise of its position of Fig. 14ᵃ may be taken to show the position of the lever and escape wheel when the box has received nine layers of bobbins and the elevator is ready to make the first part of its last drop in connection with the delivery of the tenth or last layer; and Fig. 16ᵃ, which shows the same position as Fig. 14ᵃ, may be taken as showing the arm 174 and escape wheel upon completion of the last drop of the elevator.

As shown in Fig. 14, at the level of the elevator and box preparatory to reception of the first layer of bobbins, the inside surface of the bottom of the box 125 is slightly below the level of the platform 82 as shown in the full line position of the elevator. At a time when the layer of bobbins has been nearly completely pushed into the box by the second pusher 120, the first part of a drop of the elevator occurs by release of an escapement tooth by the upper pallet 187, and the elevator and box drop to the broken line position of Fig. 14, a distance of approximately one-half the average height occupied by a layer of the bobbins as nested in the box. The position of the elevator at the time of reception of the bottom layer of bobbins is thus timed with relation to the actuation of the second pusher 120 so that the layer of bobbins being slid off from the platform will fall downwardly an unobjectionable short distance before touching the bottom of the box, thus reducing any possibility of the entering bobbins being slid along the bottom of the box in such a way as to displace their coils or injure their thread.

The second part of the drop of the elevator then occurs on the return stroke of the second pusher 120 by release of an escapement pin by the lower pallet 188 as the pallet returns to its position of Fig. 11.

Similarly at the time when any succeeding layer of bobbins has been nearly completely pushed into the box by the second pusher 120, the first part of a drop of the elevator similarly occurs, the position of the elevator at the time of reception of each succeeding layer of bobbins being timed with relation to the actuation of the second pusher 120 so that as each layer of bobbins is slid off from the platform, the layer previously discharged onto the box is spaced downwardly from the level of the platform. The layer of bobbins entering the box is thus allowed to fall downwardly an unobjectionable short distance before touching the next underlying layer. Thus rubbing of the bobbins of the entering layer over those of the preceding layer is prevented.

Discharge of containers

Figs. 14, 15 and 16 respectively show the positions of the elevator corresponding to the positions of the escape wheel of Figs. 14ᵃ, 15ᵃ and 16ᵃ.

In Fig. 14 the elevator is shown as holding the bobbin-receiving box with its bottom at a level only slightly below the level of the platform 82, preparatory to reception of the first layer of bobbins. In the position of Fig. 15 the box has received nine layers and the elevator is holding the box preparatory to the reception of the tenth and last layer. In Fig. 16 the last layer has been received and the box is being discharged from the elevator.

Beneath the bobbin-receiving box the machine is provided with pairs of rollers 200 and 201 respectively, the front two of these rollers being mounted on brackets 200ᵃ and 201ᵃ respectively, and the rear two of these rollers being mounted close to the downwardly extending apron 137 as indicated in Fig. 3.

The right-hand pair of rollers 201 is at a lower level than the left-hand pair of rollers 200, and as the elevator undergoes its last drop in connection with receiving its last layer, the box is then intercepted by the pairs of rollers 200 and 201 and allowed to tilt as shown in Fig. 16. The box is thereupon free to roll off to the right onto suitable conveyor mechanism indicated generally at 205, Fig. 17 showing a box on this conveyor 205.

Conveyor 205, at least at its end nearest the elevator, is preferably located in general prolongation of the downwardly inclined path of the bottom of a box rolling off of the pairs of rollers 200 and 201. Thus as shown in Figs. 2, 17 and 18, the conveyor 205 includes a series of rear rollers 207 and a series of front rollers 208 on which the bottom of the box can roll, the rear rollers 207 having their tops approximately in prolongation of the path determined by the rollers 200 and 201.

Preferably the conveyor mechanism 205 is tilted somewhat laterally of the path of the boxes, that is, tilted downwardly toward the front of the machine, so that the box is tilted about its bottom and away from the open rear side of the box, to hold the bobbins against the front wall of the box and prevent their accidental displacement through the open rear face. Thus as shown in Fig. 18, conveying mechanism 205 is tilted downwardly toward the front of the machine, the front rollers 208 being somewhat lower than the rear rollers 207.

Any suitable additonal rollers such as indicated at 209 may be employed to guide the front sides of boxes on the conveyor 205.

Reserve of containers

The angle pieces 135 which guide the box while it is receiving bobbins from platform 82 are preferably extended upwardly above the platform to guide a reserve consisting of one or more other similar boxes 125ª above the bobbin-receiving position.

In the upper positions of a bobbin-receiving box 125, that is during the reception of the lower layers of bobbins, the next reserve box 125ª rests directly on top of the active bobbin-receiving box, as for example in Fig. 14. However before this reserve box 125ª approaches near enough to the platform 82 to offer any risk of its bottom portion interfering with the discharge of bobbins into the active box, the reserve box as in Fig. 15 is engaged and held by detents 220 which extend from horizontal shafts 221 at opposite sides of the guideway formed by the uprights 135. Each detent 220 extends in under the reserve box sufficiently to support it as shown in Fig. 15. The detents 220 are each held outwardly by the end walls of an active box 125 as shown in Fig. 14 so that the active box can freely pass the detents, but each upper end of each box is chamfered or cut away as indicated at 222, to allow the detents to swing inwardly into position to engage the bottom of the next overlying box when that is encountered. The detent shafts 221 carry fast thereon inwardly directed levers 224 which normally urge the detents inwardly. Near their inner ends the levers 224 are slotted to receive a pin 225, Fig. 16, extending from a vertical slide bar 226. From its position shown in Fig. 16, slide bar 226 can be raised as subsequently described to move the detents from beneath the bottom of a reserve box.

Upward drive of elevator

A preferred form of driving mechanism for raising the elevator includes in addition to the rack 170 and gear 171 and shaft 172 previously described, a further gear 230 on shaft 172 (Figs. 9, 10 and 13), a pinion 231, shaft 232, gear 233, pinion 234, shaft 235, sprocket 236, chain 237, sprocket 238 and the shaft 239 of an electric motor 240. Although the motor 240 is deenergized excepting during raising of the elevator, preferably the driving connections between the motor and the elevator, are constantly in mesh, so that during the descent of the elevator these driving connections, both through their friction and through the resistance of the motor to being rotated mechanically, apply a braking action to the descent of the elevator.

Detector mechanism is preferably provided for deenergizing the motor 240 when the elevator carries a box and for energizing the motor in the absence of a box on the elevator. As shown in Fig. 13 a lever 245, pivotally mounted to swing in an opening near the middle of the elevator plate 131, has an end portion 246 adapted to be depressed by the bottom of a box on the elevator. A generally similar lever 248 is pivotally mounted near the bottom of the plunger 130, and the two levers are connected by a vertical link 250. Vertical link 250 slidably engages a bell crank 253 of which the outwardly extending arm 254 carries a mercury switch 255 connected to control the motor 240. With a box on the elevator, and the end portion 246 of the lever 245 depressed by the box as shown in full lines in Fig. 13, the link 250 is held to the right, holding the bell crank 253 in the position to maintain the mercury switch 255 open, the motor accordingly being deenergized.

After the box has rolled off of the elevator and the end portion 246 of the lever 245 is free to rise as shown in the broken lines of Fig. 13, the vertical link 250 moves somewhat to the left, allowing the bell crank 253 to turn to its lower position in which the mercury switch 255 is closed and the motor energized. Accordingly the elevator is driven upwardly as soon as a full box rolls therefrom.

When the elevator reaches the level shown in Fig. 17 at which a reserve box is held, a pin 260 extending outwardly from the elevator plunger 130 engages beneath a spring 226ª which extends inwardly from the bottom of the vertical slide bar 226, thus raising the slide bar 226 and swinging the detents 220 outwardly to release the reserve box to the elevator.

As the end portion 246 of the pivoted detector lever 245 engages the bottom of the reserve box, the resultant turning of lever 245 operates the link 250 to open the mercury switch 255 and deenergize the motor 240.

During the upward movement of the elevator from the position of Fig. 16 to the position of Fig. 17, the pawl 175 has not only made one complete revolution counterclockwise from its position of Fig. 16ª, but has moved a further substantial distance past the position of Fig. 16ª, counterclockwise, to the position of Fig. 17ª. Thereupon with the motor deenergized, the elevator can lower under the influence of gravity, and the arm 174 and pawl 175 rotate approximately 60° clockwise until the pawl 175 seats in the recess 181, as shown for instance in Fig. 14ª, thus indexing the elevator at the level of Fig. 14, ready for reception of the initial layer of bobbins in the box.

In the event that a reserve box is not present in the guideway at the time the upwardly moving elevator reaches the level to receive a box, the elevator will be prevented from continuing its upward movement by engagement of an end portion 261 of the lower lever 248 with the lower surface of a horizontal cross piece 262 of the frame shown in Fig. 13. This engagement shifts the vertical link 250 in the same manner as engagement of the detector lever 245 with a box, thus deenergizing the motor.

Instead of the switch 76 of Fig. 3, for actuating the bobbin-packing mechanism, a switch mechanism responsive to the actual presence of a bobbin at the cradle may be employed, one form of such switch mechanism being shown in the United States patent application of Edward J. Abbott and Winthrop L. Perry, Serial No. 44,754, filed August 17, 1948, particularly in Figs. 4 and 5 thereof. Another suitable form of switch mechanism for actuating the bobbin-packing mechanism in response to the presence of a bobbin is shown in Figs. 19 and 20 of the accompanying drawings.

Referring to Figs. 19 and 20, a rod 270, pivotally mounted in a U-shaped bracket 271 on the lower plow plate 32, has a downwardly bent portion 270ª extending in position to be engaged by the outer portion of a bobbin as the bobbin rolls off from the plate 32 onto the cradle. A mercury switch 272 fixed on the rod 270 is normally open but is closed as the rod is turned by a passing bobbin. Switch 272 is employed as a substitute for the switch 76 of Fig. 3 to control the solenoid 77.

I claim:
1. In a bobbin-packing machine for a winding machine of the type including a plurality of traveling winding units: a first rockable member adapted for movement in timed relation to the travel of the winding units, a pawl carried by the first rockable member and a second rockable member adapted to be rocked by the pawl, a rotatable shield normally preventing operative engagement of the pawl with the second rockable member, the shield having ratchet teeth engageable by the pawl so as to be rotated step by step by the pawl as the first rockable member rocks, the shield having a recessed portion permitting said pawl to rock the second rockable member following a plurality of rocking movements of the first rockable member, mechanism operating in synchronism with the first rockable member to accumulate one by one a group of bobbins in side by side relation and mechanism operating in synchronism with the second rockable member for displacing the successively accumulated groups of bobbins into a container.

2. In a bobbin-packing machine for a winding machine of the type including a plurality of traveling winding units: a first rockable member adapted for movement in timed relation to the travel of the winding units, a pawl carried by the first rockable member and a second rockable member adapted to be rocked by the pawl, a rotatable shield normally preventing operative engagement of the pawl with the second rockable member, the shield having ratchet teeth engageable by the pawl so as to be rotated step by step by the pawl as the first rockable member rocks, the shield having a recessed portion permitting said pawl to rock the second rockable member following a plurality of rocking movements of the first rockable member, mechanism operating in synchronism with the first rockable member to accumulate one by one a group of bobbins in side by side relation, and mechanism operating in synchronism with the second rockable member for displacing the successively accumulated groups of bobbins into a container, the machine including a dog movable with the first rockable member for indexing the second rockable member in a predetermined position upon return rocking movement of the second rockable member.

3. Bobbin-packing machine including a platform for the accumulation of a layer of bobbins, mechanism for discharging the layer of bobbins from said platform, a vertically reciprocable container-lowering elevator adapted to support a contaner in position to receive layers of bobbins from the platform and arranged to lower such container progressively past the platform in timed relation to the discharge of such layers of bobbins from the platform, a guide for an empty upper container above the container which is in bobbin-receiving position on the elevator, the guide permitting such upper empty container to rest upon and descend with the bobbin-receiving container during the initial part of descent of the bobbin-receiving container past the platform, and a detent arranged to detain the upper empty container against descending during a latter part of descent of the bobbin-receiving container past the platform.

4. Bobbin-packing machine including a platform for the accumulation of a layer of bobbins, mechanism for discharging the layer of bobbins from said platform, a vertically-reciprocable container-lowering elevator adapted to support a container in position to receive layers of bobbins from the platform and arranged to lower such container progressively past the platform in timed relation to the discharge of such layers of bobbins from the platform, a guide for an empty upper container above the container which is in bobbin-receiving position on the elevator, the guide permitting such upper empty container to rest upon and descend with the bobbin-receiving container during the initial part of descent of the bobbin-receiving container past the platform, a detent arranged to detain the upper empty container against descending during the latter part of descent of the bobbin-receiving container past the platform, and mechanism for causing the detent to release the upper empty container upon upward movement of the elevator.

5. Bobbin-packing machine including a platform for the accumulation of a layer of bobbins, mechanism for discharging the layer of bobbins from said platform, container-lowering mechanism adapted to support an open-sided container in position to receive layers of bobbins from the platform and arranged to lower such container progressively in timed relation to the discharge of such layers of bobbins from the platform, a guide for a reserve container above the container which is in bobbin-receiving position on the container-lowering mechanism, a detent engageable with the reserve container in position to detain such reserve container above the path of discharge of a layer of bobbins from the platform, said detent normally being deflected out of the downward path of containers by the walls thereof, and the machine including containers having cutaway portions at their tops permitting entry of the detent into such cutaway portion of one container beneath a portion of an overlying reserve container, so to detain such reserve container.

6. Bobbin-packing machine including a platform for the accumulation of a layer of bobbins, mechanism for discharging the layer of bobbins from said platform, container-lowering mechanism adapted to support an open-sided container in position to receive layers of bobbins from the platform and arranged to lower such container progressively in timed relation to the discharge of such layers of bobbins from the platform, a guide for a reserve container above the container which is in bobbin-receiving position on the container-lowering mechanism, a detent urged inwardly against a wall of a container held by said container-lowering mechanism, said detent being adapted to engage a lateral wall of a container without detaining such container by such engagement, the walls of the containers being so shaped and the detent being so located that said detent engages a portion of a reserve container from beneath such portion when the bottom of the reserve container is above the path of discharge of a layer of bobbins from the platform.

7. Bobbin-packing machine including a platform for the accumulation of a layer of bobbins, mechanism for discharging the layer of bobbins from said platform, container-lowering mechanism adapted to support an open-sided container in position to receive layers of bobbins from the platform and arranged to lower such container progressively in timed relation to the discharge of such layers of bobbins from the platform, a guide for an empty upper container above the box which is in bobbin-receiving position on the container-lowering mechanism, a detent engageable with the empty upper container in position to detain such upper container above the path of discharge of a layer of bobbins from the platform, the machine including containers having cutaway portions at their tops permitting entry of the detent into the downward path of a next succeeding container.

8. In a bobbin-packing machine, a platform, mechanism for accumulating successive groups of bobbins on the platform, periodically operating mechanism for discharging the groups of bobbins from the platform, a container-lowering elevator adapted to present an open-sided bobbin container for reception of the groups of bobbins as layers in such container and mechanism for lowering the elevator, the elevator having a progressive descending movement as successive layers of bobbins are discharged into the container, a conveyor adapted for removal of the container from the elevator at a lower position of the elevator, a guide adapted to present an empty container to the elevator above the level of the platform, driving mechanism for raising the elevator to such empty container, and detector mechanism responsive to absence of a container on the elevator for actuating the driving mechanism, the detector mechanism stopping actuation of the driving mechanism upon engagement of the elevator with such empty container, and mechanism for rendering the driving mechanism ineffective in the event the elevator does not encounter such empty container.

9. In a bobbin-packing machine, a platform, mechanism for accumulating successive groups of bobbins on the platform, periodically operating mechanism for discharging the groups of bobbins from the platform, a container-lowering elevator adapted to present an open-sided bobbin container for reception of the groups of bobbins as layers in such container, mechanism for progressively lowering the elevator in timed relation to the discharging mechanism, from an initial level for reception by the container of a bottommost layer of bobbins therein to a level for reception by the container of a topmost layer of bobbins therein, a conveyor adapted for removal of the container from the elevator at a lower position of the elevator, a guide adapted to present an empty upper container above the level of the platform, driving mechanism for raising the elevator, detector mechanism responsive to absence of a container on the elevator for actuating the driving mechanism to raise the elevator to the empty upper container, said detector mechanism thereupon rendering the driving mechanism ineffective, and the driving mechanism thereupon permitting the elevator to descend to said initial level.

10. In a bobbin-packing machine, a platform, mechanism for accumulating successive groups of bobbins on the platform, periodically operating mechanism for discharging the groups of bobbins from the platform, a container-lowering elevator adapted to present an open-sided bobbin container for reception of the groups of bobbins as layers in such container and mechanism for lowering the elevator, the elevator having a progressive descending movement as successive layers of bobbins are discharged into the container, a conveyor adapted for removal of the container from the elevator at a lower position of the elevator, a guide adapted to present an empty container to the elevator above the level of the platform, driving mechanism including an electric motor for raising the elevator, two levers movable with the elevator, one lever being responsive to presence of a container on the elevator and the other lever being responsive to rise of the elevator to a predetermined level, a switch controlling the motor, and a link connecting said levers and controlling the switch to stop the motor upon such response by either said lever.

References Cited in the file of this patent

UNITED STATES PATENTS

| Number | Name | Date |
|---|---|---|
| Re. 22,492 | Abbott | June 13, 1944 |
| 416,319 | Bauer et al. | Dec. 3, 1889 |
| 704,540 | Hill | July 15, 1902 |
| 768,104 | Wieda | Aug. 23, 1904 |
| 797,753 | Roth | Aug. 22, 1905 |
| 814,454 | Keyes | Mar. 6, 1906 |
| 817,375 | Keyes | Apr. 10, 1906 |
| 1,246,334 | Sears | Nov. 13, 1917 |
| 1,252,562 | Passinger | Jan. 8, 1918 |
| 1,627,362 | Webster | May 3, 1927 |
| 1,686,375 | Greer | Oct. 2, 1928 |
| 1,798,608 | Kasser | Mar. 31, 1931 |
| 1,857,082 | Hall | May 3, 1932 |
| 1,942,555 | Kimball et al. | Jan. 9, 1934 |
| 2,247,718 | Treckmann | July 1, 1941 |
| 2,345,998 | Albertoli | Apr. 4, 1944 |
| 2,362,455 | Abbott et al. | Nov. 14, 1944 |
| 2,377,367 | Perry et al. | June 5, 1945 |
| 2,395,028 | Abbott et al. | Feb. 19, 1945 |
| 2,445,998 | Drake | July 27, 1948 |
| 2,461,375 | Efthios | Feb. 8, 1949 |
| 2,556,188 | Jakob | June 12, 1951 |